United States Patent
Anderson

Patent Number: 5,920,726
Date of Patent: Jul. 6, 1999

[54] SYSTEM AND METHOD FOR MANAGING POWER CONDITIONS WITHIN A DIGITAL CAMERA DEVICE

[75] Inventor: Eric C. Anderson, San Jose, Calif.

[73] Assignee: Apple Computer, Inc., Cupertino, Calif.

[21] Appl. No.: 08/873,412

[22] Filed: Jun. 12, 1997

[51] Int. Cl.⁶ .................................................. G06F 1/30
[52] U.S. Cl. ........................................................ 395/750.01
[58] Field of Search ..................... 395/750.01, 750.02, 395/750.03, 750.04, 750.05, 750.06, 182.22, 182.2, 182.12, 737, 575

[56] References Cited

U.S. PATENT DOCUMENTS

| | | | |
|---|---|---|---|
| 5,283,792 | 2/1994 | Davies, Jr. et al. | 371/66 |
| 5,359,728 | 10/1994 | Rusmack et al. | 395/575 |
| 5,386,552 | 1/1995 | Garney | 395/575 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,560,022 | 9/1996 | Dunstan et al. | 395/750.01 |
| 5,634,000 | 5/1997 | Wicht | 395/182.08 |

OTHER PUBLICATIONS

Martyn Williams, Review–NEC PC–DC401 Digital Still Camera, AppleLink Newbytes, Mar. 15, 1996, pp. 1–3.

*Primary Examiner*—Ayaz R. Sheikh
*Assistant Examiner*—Xuan M. Thai
*Attorney, Agent, or Firm*—Carr & Ferrell LLP; Gregory J. Koerner

[57] ABSTRACT

A system and method for recovering from a power failure in a digital camera comprises a power manager for detecting and handling power failures, an interrupt handler for responsively incrementing a counter device, service routines which register to receive notification of the power failure, and a processor for evaluating the counter and providing notification of the power failure to the service routines which may then assist the digital camera to recover from the power failure.

18 Claims, 11 Drawing Sheets

SYSTEM AND METHOD FOR MANAGING POWER CONDITIONS WITHIN A DIGITAL CAMERA DEVICE

CROSS-REFERENCE TO RELATED APPLICATIONS

This application relates to co-pending U.S. patent application Ser. No. 08/702,246, entitled "System And Method For Recovering From A Power Failure Within A Digital Camera Device," filed on Aug. 23, 1996, and to co-pending U.S. patent application Ser. No. 08/719,264, entitled "System And Method For Conserving Power Within A Backup Battery Device," filed on Sep. 24, 1996, and to copending U.S. patent application Ser. No. 08/628,549, entitled "System And Method Using An LCD Indicator To Provide Status Of A Digital Camera Storage Device," filed on Apr. 10, 1996, which are hereby incorporated by reference.

BACKGROUND OF THE INVENTION

1. Field of the Invention

This invention relates generally to digital cameras and more particularly to a system and method for managing power conditions within a digital camera device.

2. Description of the Background Art

Current photographic technologies include various digital camera devices which capture image data by electronically scanning selected target objects. Digital camera devices typically process and compress the captured image data before storing the processed image data into internal or external memory devices. Furthermore, these digital camera devices may utilize multiple software routines running within a multi-threading environment to perform the various steps of capturing, processing, compressing and storing the image data.

Protecting the captured image data during the processing and compression stages (prior to final storage in non-volatile memory) is an important consideration of both camera manufacturers and camera users. Camera designers must therefore anticipate the occurrence of any events which might endanger the integrity of the captured image data.

A power failure in a digital camera device is one example of an event which might seriously jeopardize unprotected image data within the digital camera. For example, the digital camera may be performing a critical process at the time a power failure occurs. The intervening power failure may destroy the effect of the critical process and thus damage the image data or cause the digital camera to malfunction.

Furthermore, a power failure may interrupt various camera functions which typically resume their respective tasks whenever power is restored to the digital camera. The interrupted functions, however, would be unaware that a power failure had intervened. The interrupted functions would thus be unaware of the hardware reset which results from reapplying power after the power failure. This confusion between the system software and hardware would potentially endanger camera operations.

For the foregoing reasons, and because of other serious consequences of power failures in digital cameras, an improved system and method is needed for managing power conditions within a digital camera device, according to the present invention.

SUMMARY OF THE INVENTION

In accordance with the present invention, a system and method are disclosed for recovering from a power failure within a digital camera device. The preferred embodiment of the present invention includes central processing unit, a powerfail counter, a first-level interrupt handler, various interrupt service routines, a power manager and a voltage sensor.

In the preferred embodiment, the first-level interrupt handler initially sets the powerfail counter to a value of zero. Various interrupt service routines (each corresponding to a specific camera function or operation) may register themselves with the first-level interrupt handler (which coordinates all interrupts within the digital camera) to receive notification of an intervening power failure.

The power manager monitors the voltage sensor to detect a power failure within the digital camera. After detecting a power failure in which the camera operating power is less than a specified threshold value, the power manager generates a powerfail interrupt. The central processing unit responsively performs a powerfail powerdown sequence to preserve image data contained within the digital camera at the time of the intervening power failure. The power manager removes operating power from all non-critical subsystems and switches the critical subsystems to a backup power supply. The central processing unit and the camera's volatile memory are thus maintained in a static low-power mode, with all states preserved intact.

In the preferred embodiment, the first-level interrupt handler increments the powerfail counter to record the intervening power failure. The first level interrupt handler then notifies the registered interrupt service routines about the power failure restart and corresponding hardware reset.

After the power failure is remedied, the central processing unit performs a restart sequence to preserve any stored image data and to return the digital camera to a normal operational mode. The camera powerup sequence is performed in response to the contents of registers in the power manager. The power manager registers advantageously contain corresponding bits which indicate the conditions present in the camera at the time that the camera shutdown occurred. The present invention thus preserves the integrity of captured image data and effectively assists the digital camera to recover from an intervening power failure.

DETAILED DESCRIPTION OF THE PREFERRED EMBODIMENT

The present invention discloses a system and method for managing power conditions within a digital camera device and comprises a power manager for detecting and handling power failures, an interrupt handler for providing notice of power failures, service routines which register to receive notification of the power failure, and a processor for responsively controlling the digital camera during recovery from the power failure.

Figure 1:
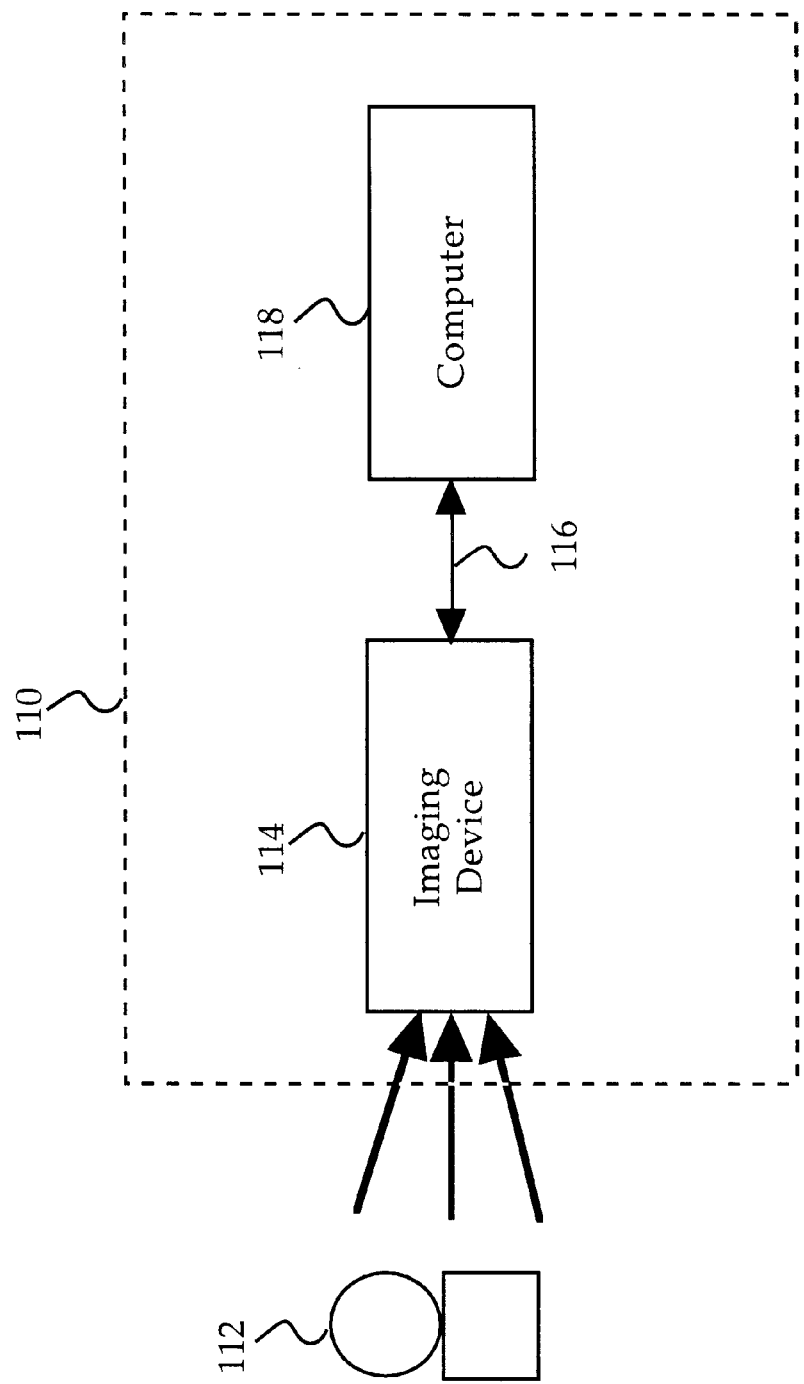
FIG. 1 is a block diagram of a digital camera according to the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 126 also passes various status and control signals between imaging device 114 and computer 118.

Figure 2:
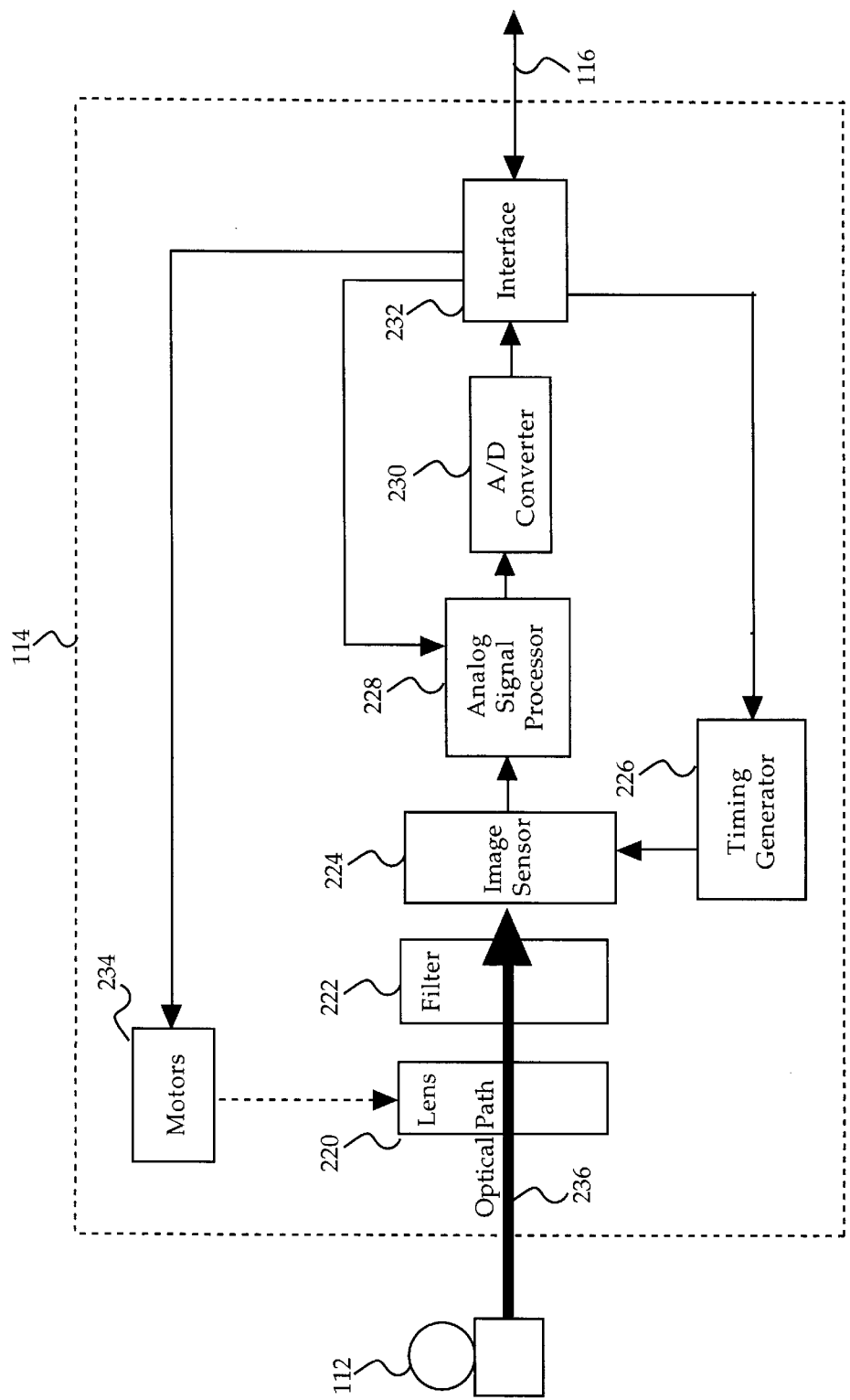
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. patent application Ser. No. 08/355,031, entitled "A System and Method For Generating a Contrast Overlay as a Focus Assist for an Imaging Device," filed on Dec. 13, 1994 is incorporated herein by reference and provides a detailed discussion of the preferred elements of imaging device 114. Briefly, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
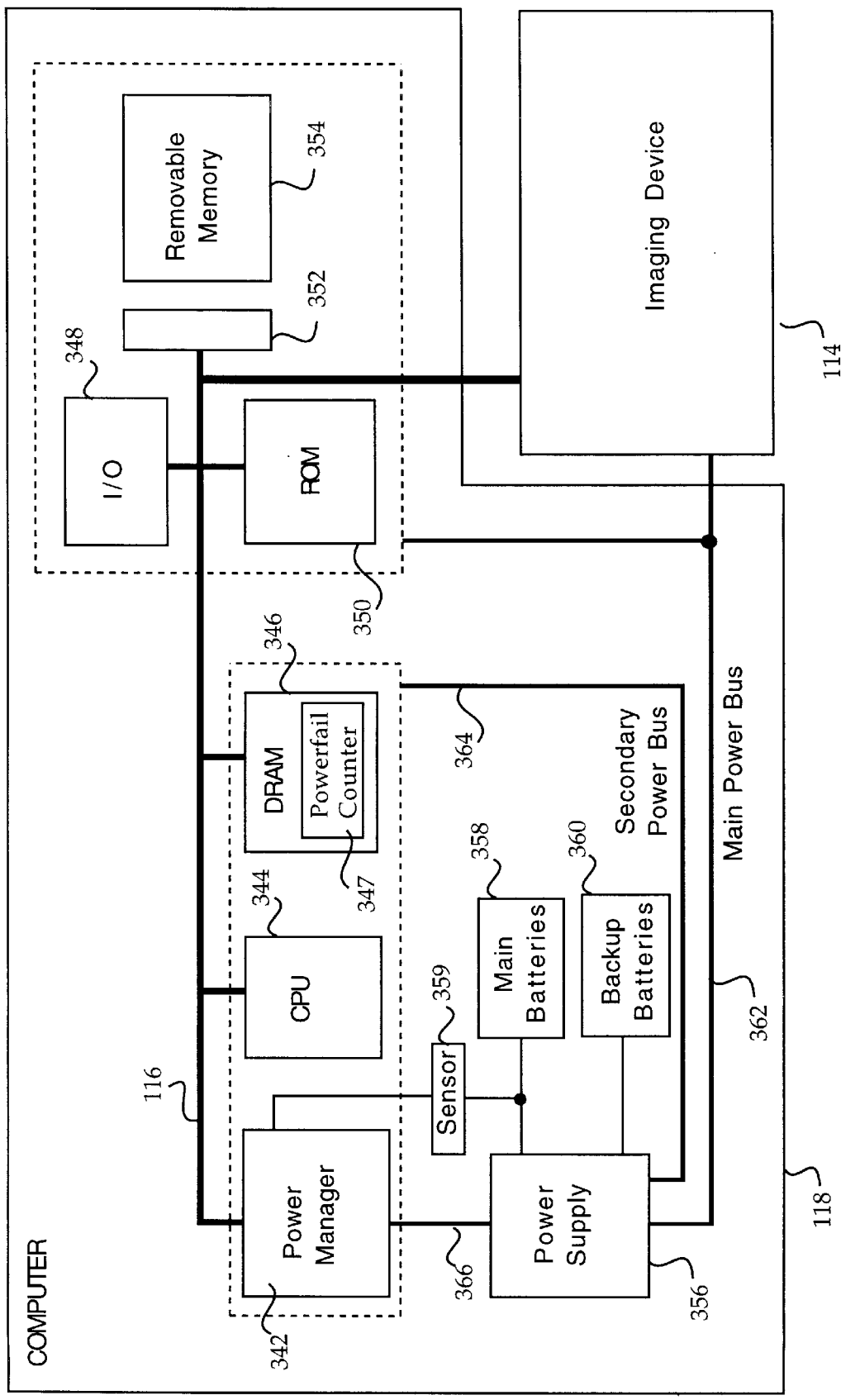
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and connector 352. In the preferred embodiment, removable memory 354 may also connect to system bus 116 via connector 352.

Power manager 342 communicates via line 366 with power supply 356 and coordinates power management operations for camera 110 as discussed below in conjunction with FIGS. 6–11. CPU 344 typically includes a conventional processor device for controlling the operation of camera 110. In the preferred embodiment, CPU 344 is capable of currently running multiple software routines to control the various processes of camera 110 within a multi-threading environment. DRAM 346 is a contiguous block of dynamic memory which may be selectively allocated to various storage functions by computer 118. DRAM 346 includes a powerfail counter 347 which is incremented each time a power failure occurs in power supply 356. DRAM 346 and powerfail counter 347 are further discussed below in conjunction with FIGS. 9–11.

I/O 348 is an interface device allowing communications to and from computer 118. For example, I/O 348 permits an external host computer (not shown) to connect to and communicate with computer 118. I/O 348 also permits a camera 110 user to communicate with camera 110 via a set of externally-mounted user controls and via an external LCD display panel. ROM 350 typically comprises a conventional nonvolatile read-only memory which stores a set of computer-readable program instructions to control the operation of camera 110. ROM 350 is further discussed below in conjunction with FIG. 4. Removable memory 354 serves as an additional image data storage area and is preferably a non-volatile device, readily removable and replaceable by a camera 110 user via connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in the main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Voltage sensor 359 detects the voltage supplied by main batteries 358 and responsively provides the detected voltage reading to power manager 342. The operation of power manager 342, power supply 356 and voltage sensor 359 are further discussed below in conjunction with FIGS. 6–11.

Figure 4:
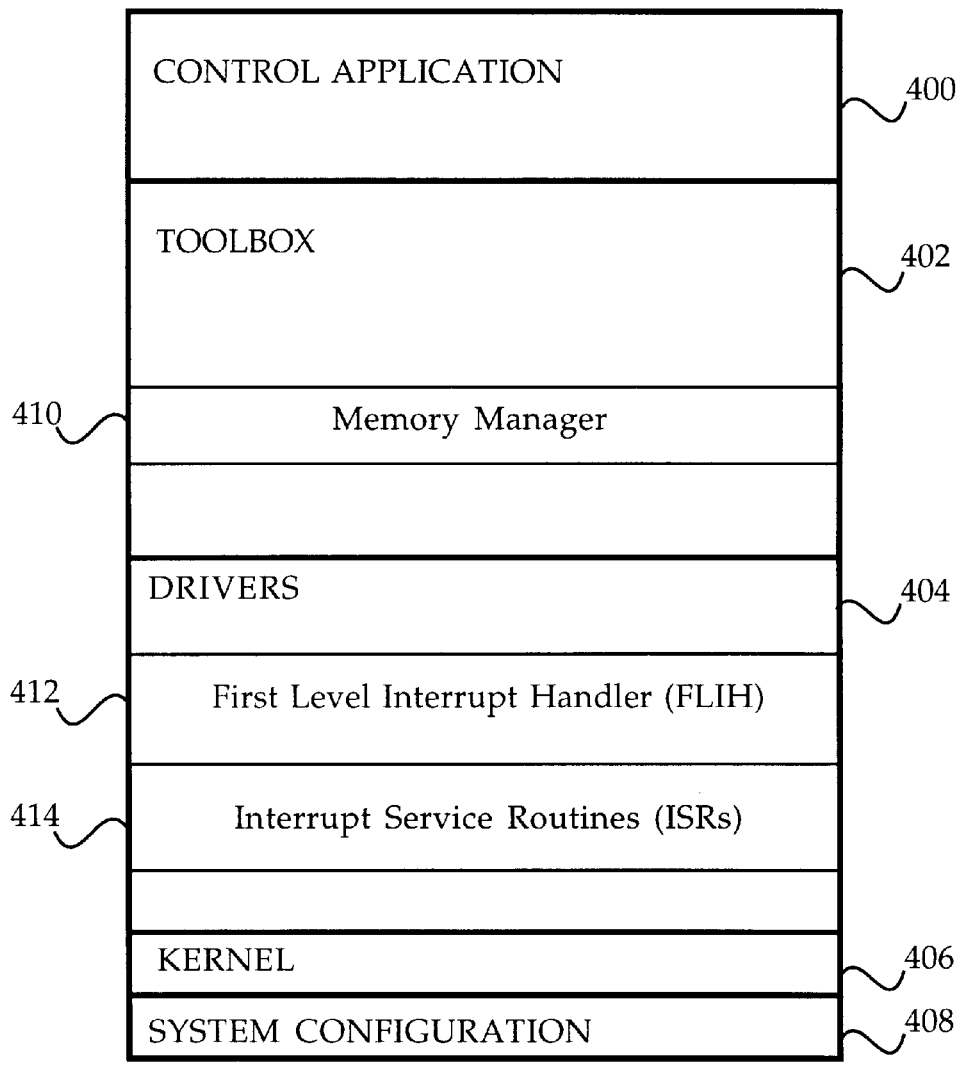
FIG. 4 is a memory map showing the preferred embodiment of the Read-Only Memory of FIG. 3.
Figure 4:
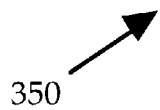

Referring now to FIG. 4, a memory map showing the preferred embodiment of read-only memory (ROM) 350 is shown. In the preferred embodiment, ROM 350 includes control application 400, toolbox 402, drivers 404, kernel 406 and system configuration 408. Control application 400 comprises program instructions for controlling and coordinating the various functions of camera 110. Toolbox 402 contains selected function modules including memory manager 410 which is controlled by control application 400 and responsively allocates DRAM 346 storage locations depending upon the needs of computer 118 and the sets of received image data.

Drivers 404 control various components of camera 110 and include a first level interrupt handler (FLIH) 412 and various interrupt service routines (ISRs) 414. In the preferred embodiment, FLIH 412 is a software routine which coordinates all interrupts within camera (110. FLIH 412 typically handles ordinary non-critical interrupts and also handles non-maskable critical interrupts such as a power failure in main batteries 358. FLIH 412 preferably communicates with the various ISRs 414 which are each designed to handle a specific corresponding interrupt within camera 110. FLIH 412 notifies the appropriate ISRs 414 via a "signal" when the interrupts occur. A signal is a mechanism used by multi-tasking operating systems for interprocess communications and synchronization.

For example, a camera 110 user may request zoom motor 234 to perform a zoom operation using lens 220. When the requested zoom process is complete, an interrupt is generated to indicate that zoom motor 234 and lens 220 have reached their destination positions. The particular ISR 414 which corresponds to the foregoing zoom process then responsively handles the generated interrupt and provides a status update to higher-level routines, if necessary. In preferred embodiment, kernel 406 provides a range of basic underlying services for the camera 110 operating system. System configuration 408 performs initial start-up routines for camera 110, including the boot routine and initial system diagnostics.

Figure 5:
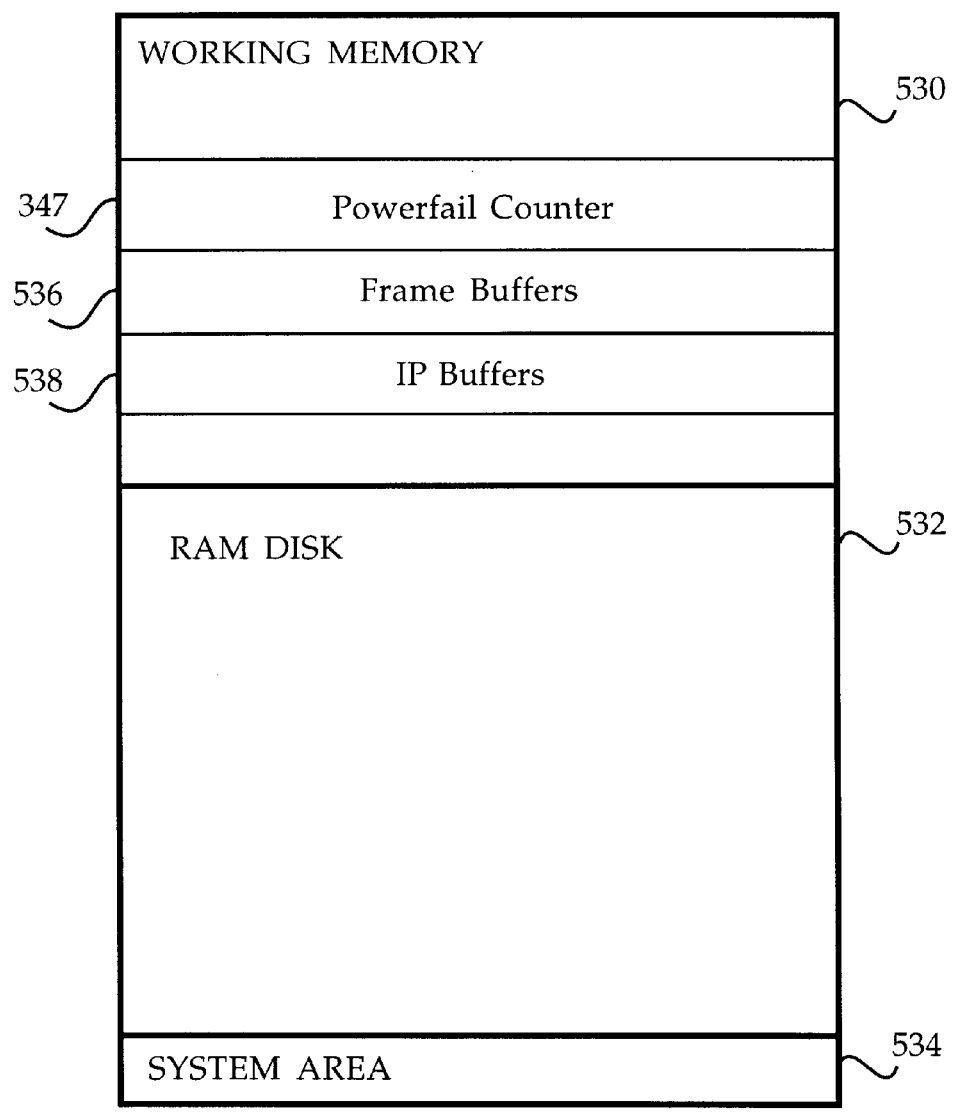
FIG. 5 is a memory map showing the preferred embodiment of the Dynamic Random-Access Memory of FIG. 3.

Referring now to FIG. 5, a memory map showing the preferred embodiment of dynamic random-access memory (DRAM) 346 is shown. In the preferred embodiment, DRAM 346 includes working memory 530, RAM disk 532 and system area 534. Working memory 530 includes a powerfail counter 347, frame buffers 536 (for initially storing sets of raw image data received from imaging device 114) and image processing (IP) buffers 538 (for temporarily storing image data during the image processing and compression 420 process). In the preferred embodiment, power fail counter 347 stores a value which first-level interrupt handler 412 preferably increments each time voltage sensor 359 detects a power failure in main batteries 358. Powerfail counter 347 is further discussed below in conjunction with FIGS. 9–11. Working memory 530 may also contain various stacks, data structures and variables used by CPU 344 while executing the software routines used within computer 118.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Figure 6:
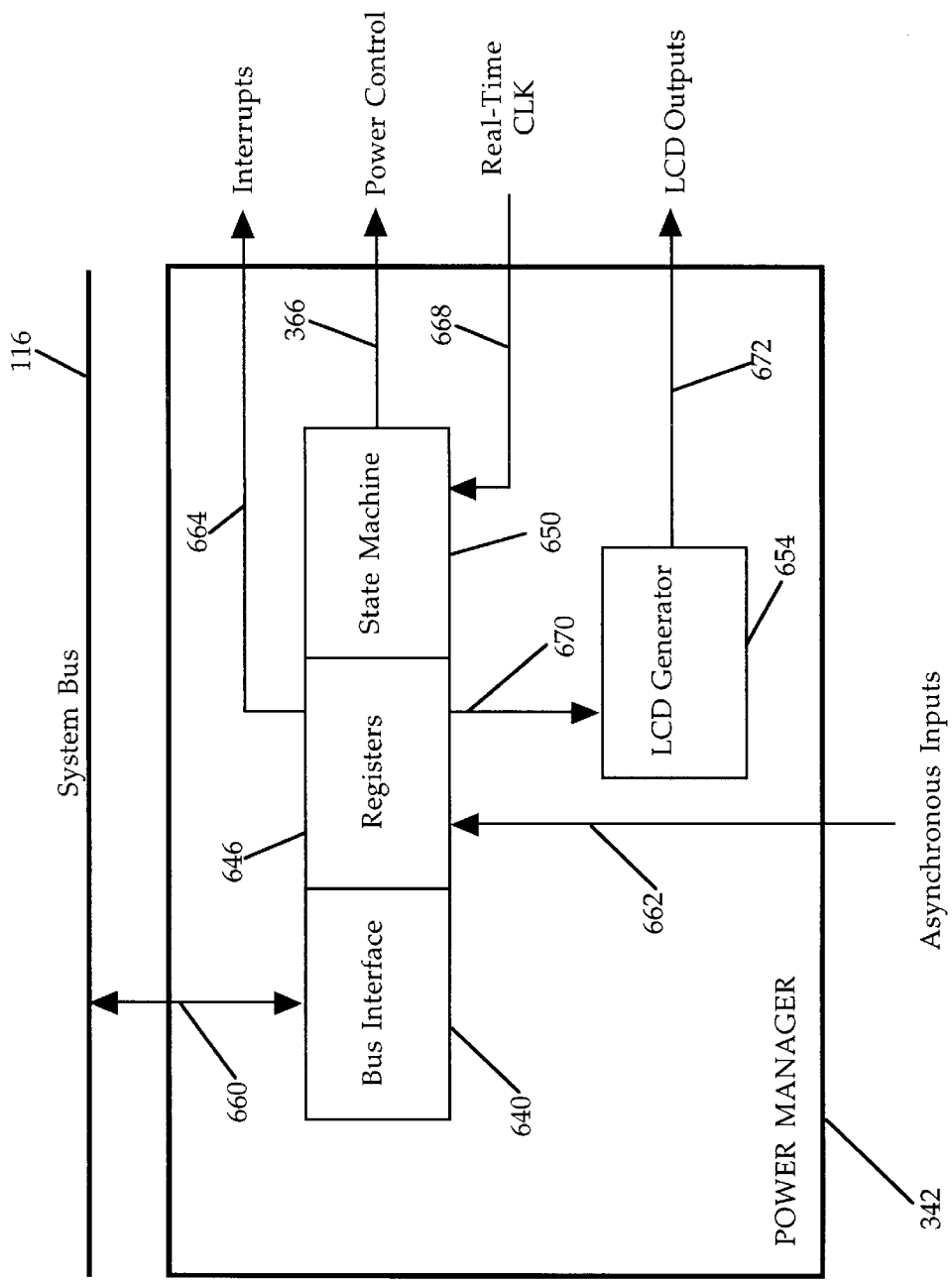
FIG. 6 is a block diagram of the preferred embodiment of the power manager of FIG. 3.

Referring now to FIG. 6, a block diagram of the preferred embodiment of power manager 342 (FIG. 3) is shown.

Power manager 342 includes bus interface 640, registers 646, state machine 650 and LCD generator 654. Bus interface 640 is connected, via line 660, to system bus 116 and may thus handle slave access of registers 646 within power manager 342 (typically by CPU 344).

Registers 646 include a PCCR register, a PMCR register, a PSCR register and a PMIR register each described below in conjunction with FIG. 7. Registers 646 also include external input pins (not shown) that asynchronously affect selected bit transitions within registers 646. These input pins include PMRST__, MBFAIL__, MBALERT__, PWRSW__, IOSYS__, and USRRST__. The effect of these pin transitions is also dependent on the current state of power manager 342. The following discussion describes the above-referenced register 646 input pins and the results of asserting each of these input pins via line 662.

A logic level of value "0" on the PMRST__ pin causes all bits in the PCCR, PMIR and PMCR registers to be cleared to their inactive states. This action occurs regardless of the current state of power manager 342. In response, power manager 342 will then transition to the IDLE__OFF state (described below). A "1 to 0" transition on the MBFAIL pin causes all bits in the PCCR register to be immediately deasserted if power manager 342 is in the IDLE__ON state (described below). This transition will also set the PwrFail bit to 1 in the PMCR register, the MBFail bit to 1 in the PMIR register, and assert the IRQ0__ pin. If power manager 342 is in any other state than IDLE__ON, any transition on this pin will be ignored. A "1 to 0" transition on the MBALERT pin will cause the Strobe power and control bits in the PCCR to be immediately deasserted if power manager 342 is in the IDLE__ON state. This transition will also set the MBAlert bit in the PMIR register to 1 and activate the IRQ1__ power alert interrupt. If power manager 342 is in any other state than IDLE__ON, any transition on this pin will be ignored.

In the preferred embodiment, a momentary switch may be used to cause a "1 to 0" transition on the PWRSW__ pin. The momentary "1 to 0" transition on the PWRSW__ pin will immediately set the UsrPwr bit to 1 in the PMCR register if power manager 342 is in the IDLE__OFF state. It will also initiate the PowerUp state sequencing. Furthermore, the momentary "1 to 0" transition on the PWRSW__ pin will immediately set the PDReq bit in the PMIR register if power manager 342 is in the IDLE__ON state. It will also cause the assertion of the IRQ2__ pin. If power manager 342 is in any other state than IDLE__ON or IDLE__OFF, the momentary transition on this pin will be ignored.

In an alternate embodiment without the above-mentioned momentary switch, a "1 to 0" transition on the PWRSW__ pin will immediately set the UsrPwr bit to 1 in the PMCR register if power manager 342 i s in the IDLE__OFF state. It will also initiate the PowerUp state sequencing. If power manager 342 is in any other state than IDLE__OFF, the "1 to 0" transition on this pin will be ignored.

A "0 to 1" transition on the PWRSW__ pin will immediately set the PDReq bit in the PMIR register if power manager 342 is in the IDLE__ON state. It will also cause the assertion of the IRQ2__ pin. If power manager 342 is in any other state than IDLE__ON, the "0 to 1" transition on this pin will be ignored.

A "1 to 0" transition on the IOSYS__ pin will immediately set the IOPwr bit to 1 in the PMCR register if power manager 342 is in the IDLE__OFF state. It will also initiate the PowerUp state sequencing. A "1 to 0" transition on the IOSYS__ pin will immediately set the IOReq bit in the PMIR register if power manager 342 is in the IDLE_ON state. This transition will also cause the assertion of the IRQ3_ pin. A "1 to 0" transition on the USRRST_ pin will immediately set the USRRST bit to 1 in the PMCR register if power manager 342 is in the IDLE_ON state. This transition will also cause power manager 342 to issue a CPU 344 soft reset (SRST) for 30 us (one clock pulse of the 32 KHz real-time clock), starting at the next rise of PMCLK. CPU 344 will then hold SRST low for 16 ms. The PCCR and PMIR registers are also cleared. Additionally, all bits in the PMCR are cleared except for the USRRST bit. If power manager 342 is in any other state than IDLE_ON, any transition on this pin will be ignored. Power manager 342 will remain in the IDLE_ON state.

Registers 646 generate a series of interrupts onto line 664 in response to various conditions and states in camera 110. Registers 646 and the generated interrupts are further discussed below in conjunction with FIGS. 7 and 8. Registers 646 also provide signals to LCD generator 654 via line 670. LCD generator 654 responsively generates and provides LCD outputs to an LCD display unit (not shown) via line 672. The LCD display unit is preferably mounted on the exterior surface of camera 110 and forms part of a user interface for camera 110.

In the preferred embodiment, power manager 342 has three main transition events called PowerUp, PowerDown and PowerDown w/Save. The PowerUp event occurs when power manager 342 is in the IDLE_OFF state and one of three external events occur. These external events occur when the user turns on the camera (PWRSW_low), when a timer wakeup (TEXP high) is signaled, and when the host attempts to connect to the camera (IOSYS_low). The PowerDown event occurs when power manager 342 is in the IDLE_ON state and the software writes a 1 to the PwrDwn bit in the PMCR and the MemSave bit in the PMCR is set to 0. The PowerDown w/Save occurs when power manager 342 is in the IDLE_ON state and the software writes a 1 to the Pwrdwn bit in the PMCR and the MemSave bit in the PMCR is set to 1.

Power manager 342 includes state machine 650 which preferably has eight main synchronous states. The following is a description of the main states and the events that trigger a transition into the particular state. The IDLE_OFF state is the initial state after PMRST_ is released. For the PowerUp sequence, power manager 342 starts from IDLE_OFF, moves through two more states and ends with the IDLE_ ON state.

The IDLE_OFF_SAVE state is entered from the IDLE_ ON state when the MemSave option is specified. For the PowerUp sequence, power manager 342 starts from IDLE_ OFF_SAVE, moves through two more states and ends with the IDLE_ON state. The IDLE_ON is the end state for a PowerUp sequence. In the PowerDown sequence, power manager 342 starts from IDLE_ON and ends in IDLE_ OFF or IDLE_OFF_SAVE.

In the preferred embodiment, there are two types of PowerDown sequences called PWRDWN_NORM and PWRDWN_SAVE. The PWRDWN_NORM sequence executes various steps to PowerDown camera 110 before entering an idle state. This sequence is executed if the software writes a 1 to the PwrDwn bit in the PMCR when power manager 342 is in the IDLE_ON state and the MemSave bit in the PMCR is programed to 0. The PWRDWN_SAVE sequence executes various steps to PowerDown camera 110 before entering an idle state. This sequence is entered if the software writes a 1 to the PwrDwn bit in the PMCR when power manager 342 is in the IDLE_ON state and the MemSave bit in the PMCR is programmed to 1.

The CNT_PRE_WAIT state is used to wait for voltage sensor 359 to start operation. When the desired time has passed, power manager 342 will continue the PowerUp sequence and move to the CNT_WAIT state which is used to wait for the test of main batteries 358 to complete. When the desired time has passed, power manager 342 will continue the PowerUp sequence and move to the POR_IRQ_ WAIT state.

The CNT_PRE_WAIT_SAVE is also used to wait for voltage sensor 359 to start operation. When the specified time has passed, power manager 342 continues the (PowerUp sequence and also switches to the CNT_WAIT_ SAVE state. The CNT_WAIT_SAVE state is used to wait for testing of main batteries 358 to complete while the MemSave is specified. When the desired time has passed, power manager 342 will continue the PowerUp sequence and move to the POR_IRQ_WAIT state. The POR_IRQ_ WAIT state is used to wait one PMCLK cycle for power manager 342 to drive the POR_ signal or to deassert the IRQ0_ interrupt before transitioning to the IDLE_ON state.

State machine 650 receives, via line 668, a real-time clock which preferably operates at a 32 KHz rate. In the preferred embodiment, state machine 650 also generates a power control signal which is supplied to power supply 356 via line 366 to advantageously control the operation of power supply 356 according to the present invention.

Figure 7:
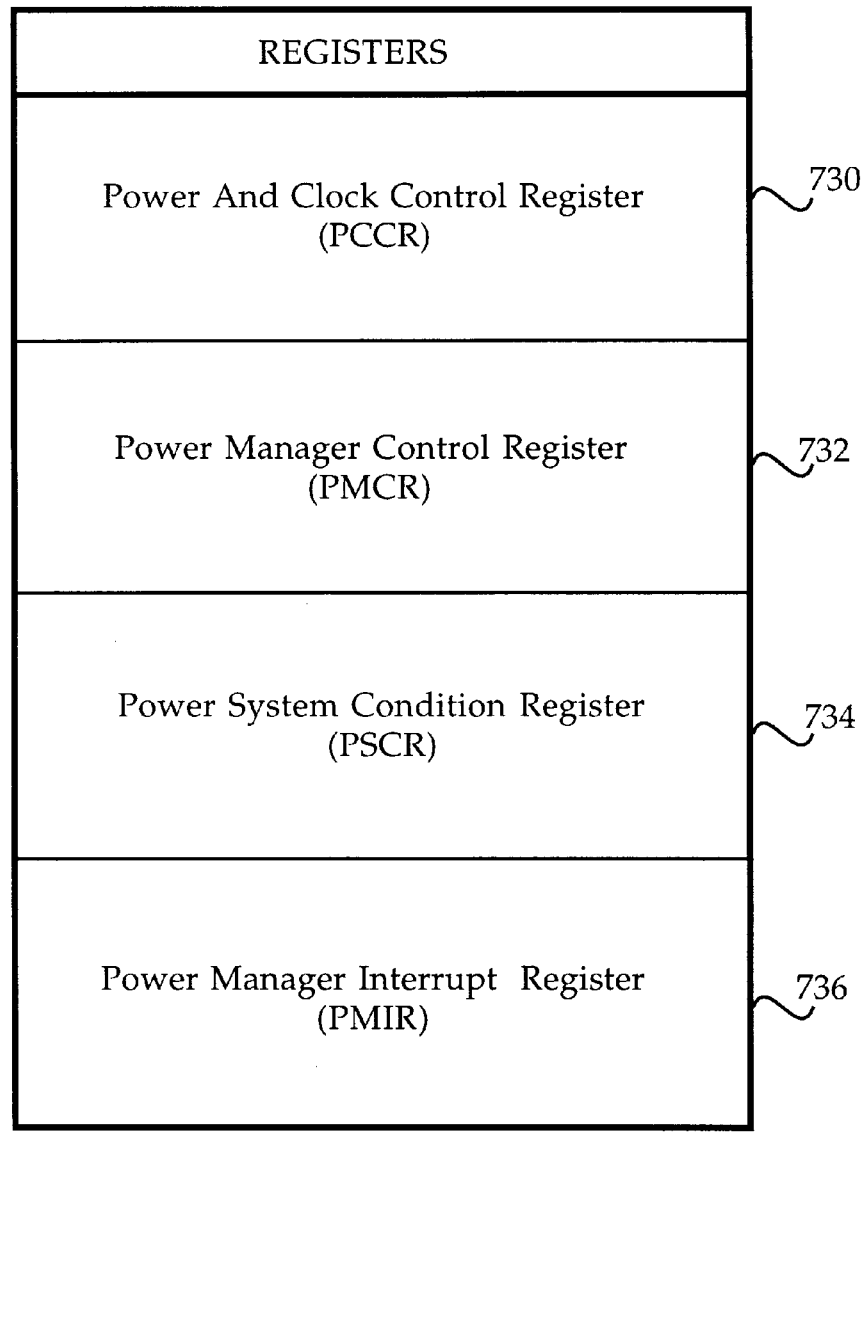
FIG. 7 is a block diagram of the preferred embodiment of the registers of FIG. 6.

Referring now to FIG. 7, a block diagram of the preferred embodiment of registers 646 is shown. In the preferred embodiment, registers 646 include power and clock control register (PCCR) 730, power manager control register (PMCR) 732, power system condition register (PSCR) 734 and power manager interrupt register (PMIR) 736.

PCCR 730 is an 8-bit read/write register which includes the following binary fields. Bits 6–7 of PCCR 730 correspond to a field named I/O. The IO field is an I/O Enable and these bits control which I/O system is engaged and in full power mode. If the I/O field is 00, then no I/O is enabled and if the I/O field is 01, then the serial port is enabled. If the I/O field is 10, then USB is enabled and if the I/O field is 11, then IRDA is enabled.

Bit 5 of PCCR 730 corresponds to a field named LCDCtrl. The LCDCrtl field is a LCD and backlight power control. Bit 4 of PCCR 730 corresponds to a field named AudioEn. The AudioEn field is an audio system clock and power enable. Bit 3 of PCCR 730 corresponds to a field named ICHClk. The ICHClk field is an image capture head clock enable. Bit 2 of PCCR 730 corresponds to a field named ICHPwr. The ICHPwr field is an image capture head power control (and also controls LED power). Bits 0–1 of PCCR 730 correspond to a field named ICHStrb. The ICHStrb field is an image capture head strobe power control and level. Both bits are cleared by the Power Alert condition.

All bits of PCCR 730 are placed in their deasserted state by the Power Fail condition. The ICHstrb bits are cleared by the Power Alert condition. All bits correspond to pins on the power manager 342 ASIC. Software controls the setting or clearing of the bits to power down subsystems. All bits are placed in their deasserted state during PMRST_.

PMCR 732 is an 8-bit read/write register which is the main control center of power manager 342. All bits are cleared to zero during PMRST_. PMCR 732 preferably includes the following binary fields. Bit 7 of PMCR 732 corresponds to a field named RESUME. The RESUME field is set and cleared by software and is set for power failure shutdown or "instant-on shutdown". RESUME prevents reset of CPU 344 on start-up. Bit 6 of PMCR 732 corresponds to a field named MSAVE. The MSAVE field is set and cleared by software and is set to maintain power to DRAM 346 and CPU 344 in Shut Down mode. MSAVE is also used to generate an LCD status indication during main power off/on.

Bit 5 of PMCR 732 corresponds to a field named DiskIU. The DiskIU field is set and cleared by software and is set when the DiskInUse indicator on the status LCD is required. The status LCD maintains this display with main power off/on. Bit 4 of PMCR 732 corresponds to a field named PwrDwn. The PwrDwn field is set by software to initiate power down from power manager 342. CPU 344 enters Power Down Mode or Deep Steep Mode 1 PMCLK cycle following the next rising edge of PMCLK after setting this bit. This bit is cleared on Power Up sequence by power manager 342. While power manager 342 is clearing this bit during the PowerOn sequence, writes to this bit will be disabled.

Bit 3 of PMCR 732 corresponds to a field named User-Pwr. The UserPwr field is set during the normal power up sequence if initiated by a user pressing the main power switch (PWRSW input). UserPwr is cleared by software writing a 1 to this bit. Bit 2 of PMCR 732 corresponds to a field named IOPwr. The IOPwr field is set during the normal power up sequence if initiated by the external communications port 348 (IOSYS_ input). If neither UserPwr, IOPwr, or UserRst is set, software will assume a timer initiated restart has occurred. Bit 1 of PMCR 732 corresponds to a field named UserRst. The UserRst field is set by the user pressing the RESET button (USERRST_ input) and is cleared by software by writing a 1 to this bit during boot. If neither PwrFail or UserRst is set, software assumes a normal power up. Bit 0 of PMCR 732 corresponds to a field named PwrFail. The PwrFail field is set at the "0 to 1" transition of the MBFail bit in PSCR 734. The PwrFail field is cleared by software writing a 1 to this bit after restart.

PSCR 734 is an 8-bit read-only register with the following fields. Bit 7 of PSCR 734 corresponds to a field named BBOK. The BBOK field indicates the backup batteries 360 contain sufficient operating power (above 4.5 volts). Bit 6 of PSCR 734 corresponds to a field named MBStart. The MBStart field corresponds to the main batteries 358 START level (above 6.0 volts). MBStart indicates that there is enough energy to do a camera 110 startup. Bit 5 of PSCR 734 corresponds to a field named MBLow. The MBLow field indicates that main batteries 358 are above 6.4 volts. Bit 4 of PSCR 734 corresponds to a field named MBGood. The MBGood field indicates that main batteries 358 are above 6.9 volts. Bit 3 of PSCR 734 corresponds to a field named MBFull. The MBFull field indicates that main batteries 358 are above 7.4 volts. Bit 2 of PSCR 734 corresponds to a field named ACPwr. The ACPwr field indicates that external AC power is being supplied to the camera via an external power adapter. Bit 1 of PSCR 734 corresponds to a field named MBAlert. MBAlert indicates an ALERT condition for main batteries 358 (below 5.4 volts). This bit reflects the current level of the MBALERT_ input. A "1 to 0" transition on the MBALERT_ pin generates an alert interrupt (IRQ1_ output), sets the Pfail bit in PMIR 736 to 1, and clears two bits in PCCR 730. Bit 0 of PSCR 734 corresponds to a field named MBFail. The MBFail field indicates a PwrFail in main batteries 358 (below 5.2 volts) and reflects the current level of the MBFAIL_ input. A "1 to 0" transition on the MBFAIL_ pin generates a power failure interrupt (IRQ0_ output), sets the MBALERT bit in PMIR 736, deasserts all bits in PCCR 730, and sets the PwrFail bit in PMCR 732. PSCR 734 thus indicates the state of eight power system conditions.

PMIR 736 is an 8-bit read/write register with the following fields. Bits 4–7 of PMIR 736 correspond to a field named Reserved. The Reserved field always reads 0 and is reserved for potential future functionality in camera 110. Bit 3 of PMIR 736 corresponds to a field named IOReq. The IOReq field is a request from the external communications port 348 of camera 110. A "1 to 0" transition on the IOSYS_ pin while power manager 342 is in the IDLE_ON state generates an IOReq interrupt (IRQ3_output). A write of 1 to this bit will immediately clear the interrupt.

Bit 2 of PMIR 736 corresponds to a field named PwrDwn. The PwrDwn field is a power down request generated by a camera 110 user (PWRSW pin). A "0 to 1" transition on the PWRSW_ pin generates a PwrDwn interrupt (IRQ2_ output). A write of 1 to this bit will immediately clear the interrupt. Bit 1 of PMIR 736 corresponds to a field named MBAlert. The MBAlert field indicates an ALERT condition (below 5.4 volts) for main batteries 358. A "1 to 0" transition on the MBALERT_ pin immediately generates an ALERT interrupt (IRQ1_ output) and clears two bits in the PCCR 730. A write of 1 to this bit will immediately clear the interrupt. Bit 0 of PMIR 736 corresponds to a field named MBFail. The MBFail field indicates a power failure condition (below 5.2 volts) in main batteries 358. A "1 to 0" transition on the MBFail_ pin generates a PwrFail interrupt (IRQ0_ output), deasserts all bits in the PCCR 730, and sets the PwrFail bit in the PMCR 732. A write of 1 to this bit will immediately clear the interrupt. PMIR 736 thus indicates the interrupt status of camera 110 and is also used to clear the interrupts. All bits are cleared during PMRST_.

Figure 8:
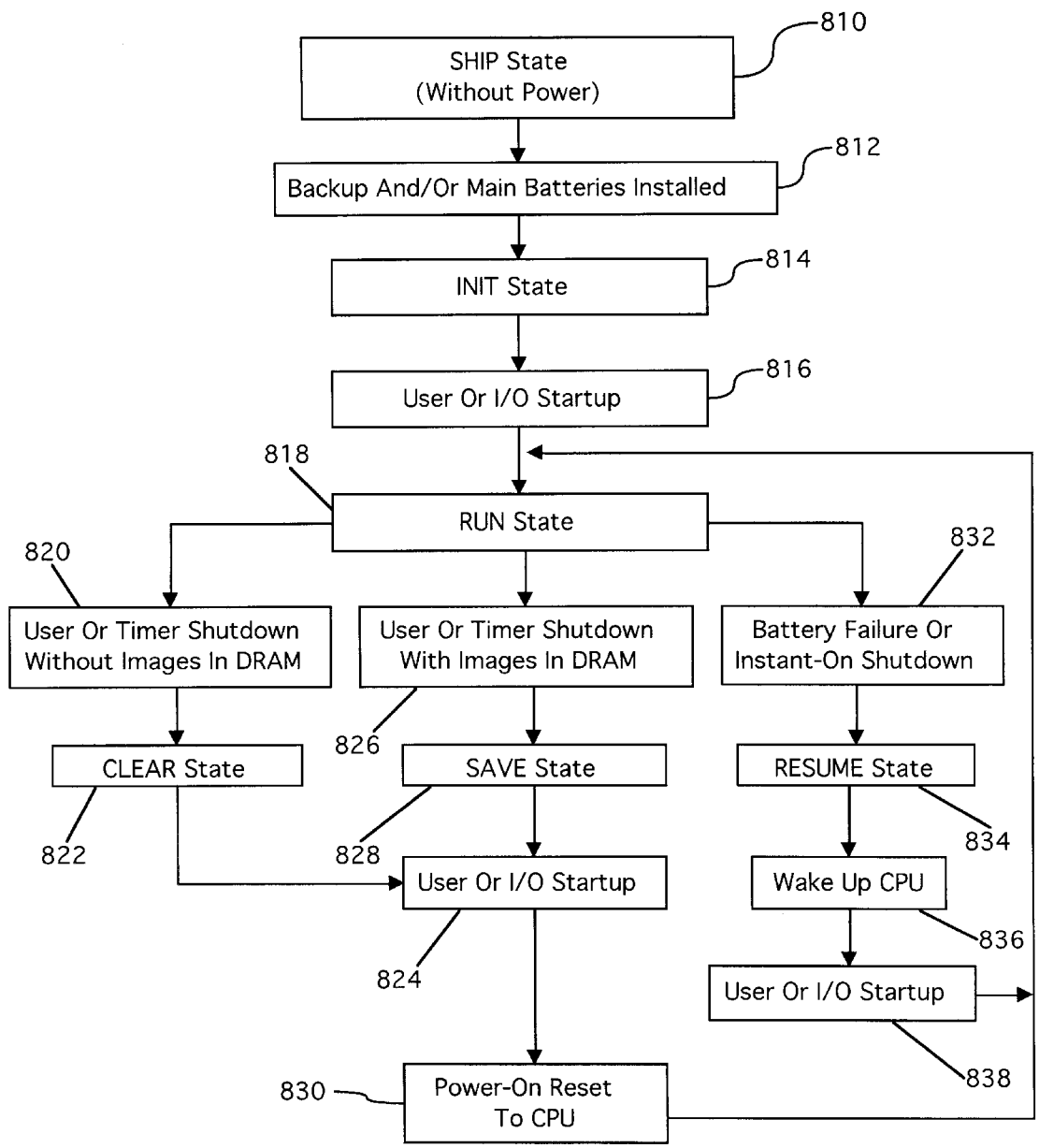
FIG. 8 is a flowchart of the preferred power states for the power manager of FIG. 3.

Referring now to FIG. 8, a flowchart of the preferred power states for power manager 342 is shown. Initially, in step 810, camera 110 is in the SHIP state with neither main batteries 358 nor backup batteries 360 installed. In steps 812 and 814, the SHIP to INIT transition occurs when power is first applied to the camera 110, either from backup batteries 360, main batteries 358, or via external power.

In steps 816 and 818, the INIT to RUN transition occurs when the user turns on camera 110 (PWRSW low transition) or when the host computer attempts to connect to camera 110 (IOSYS low transition). CPU 344 is in POWER DOWN MODE prior to this transition. Following step 818, the FIG. 8 sequence proceeds either to step 820, 826 or 832, depending on the type of shutdown occurring in camera 110.

In steps 820 and 822, a CLEAR state may be entered if a shutdown occurs without images in DRAM 346. The RUN to CLEAR transition occurs when a user turns off camera 110 (PWRSW high transition), a host or script command to shut down camera 110 occurs, camera 110 times out after no activity, or camera 110 enters a timed shutdown. In the CLEAR state, the MSAVE bit in PMCR 732 is set to zero and the RESUME bit in PMCR 732 is also set to zero.

In steps 826 and 828, a SAVE state may be entered if a shutdown occurs with images in DRAM 346. The RUN to SAVE transition occurs when a user turns off camera 110 (PWRSW high transition, followed by software response to interrupt), a host or script command to shut down camera 110 occurs, camera 110 times out after no activity, or camera 110 enters a timed shutdown. In the SAVE state, the MSAVE bit in PMCR 732 is set to one and the RESUME bit in PMCR 732 is set to zero. In steps 832 and 834, a RESUME state may be entered if a shutdown occurs due to a power failure in main batteries 358 or instant-on shutdown. In the RESUME state, the MSAVE bit in PMCR 732 is set to one and the RESUME bit in PMCR 732 is also set to one.

In steps 824, 830 and 818, a CLEAR to RUN transition may occur if a user turns on camera 110 (PWRSW low transition), a timer wakeup (TEXP) is signaled or if the host computer attempts to connect to camera 110 (IOSYS low transition). CPU 344 is in POWER DOWN MODE prior to this transition. In steps 824, 830 and 818, a SAVE to RUN transition may occur if a user turns on camera 110 (PWRSW low transition), a timer wakeup (TEXP) is signaled or when the host computer attempts to connect to camera 110 (IOSYS low transition). CPU 344 is in DEEP SLEEP MODE prior to this transition. In steps 834, 836 and 838, a RESUME to RUN transition may occur if a wake up of CPU 344 is signaled and a user turns on camera 110 (PWRSW low transition), a timer wakeup (TEXP) is signaled or the host computer attempts to connect to camera 110 (IOSYS low transition).

In FIG. 8, power manager 342 thus sequentially enters the SHIP state, the INIT state and the RUN state. Power manager 342 then may enter either the CLEAR state, the SAVE state or the RESUME state, depending on the particular shutdown conditions. Finally, power manager 342 typically transitions back to the RUN state to recommence normal operation, in accordance with the present invention.

Figure 9:
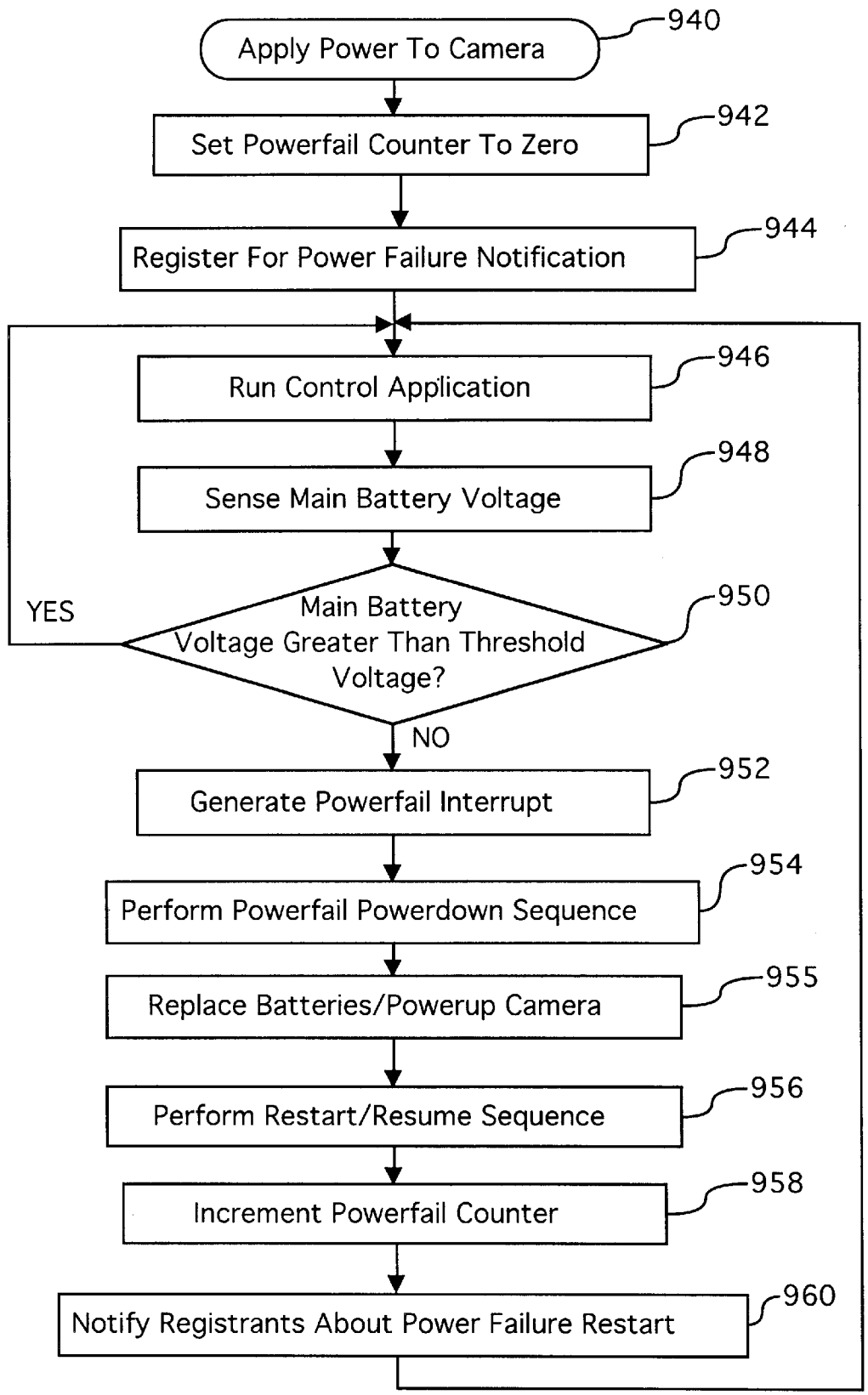
FIG. 9 is a flowchart of preferred general method steps for recovering from a power failure according to the present invention.

Referring now to FIG. 9, a flowchart of preferred general method steps for recovering from a power failure is shown. Initially, a user applies 940 power to camera 110 by installing main batteries 358 and backup batteries 360, and then activating an externally-mounted power on-off switch. First-level interrupt handler (FLIH) 412 then sets 942 powerfail counter 347 to a value of zero. Next, various interrupt service routines 414 register 944 with the first level interrupt handler 412 to request notification in the event of a power failure in main batteries 358.

CPU 344 then runs 946 control application 400 to operate camera 110 in normal operation mode which captures, processes, compresses and stores sequential sets of image data. In normal operation mode, CPU 344 periodically requests the execution of various critical processes. In the preferred embodiment, CPU 344 repeatedly checks powerfail counter 347 to determine whether a critical process has been interrupted by an intervening power failure.

Next, voltage sensor 359 senses 948 the voltage level of main batteries 358 and provides power manager 342 with the sensed voltage level. Power manager 342 then determines 950 whether the voltage level of main batteries 358 is greater than a predetermined threshold voltage level. The threshold value is typically selected to be incrementally higher than the minimum operating voltage (to permit orderly shutdown of the camera 110 processes). If the voltage of main batteries 358 is greater than the selected threshold value, then the FIG. 9 process repeats the steps 946, 948 and 950.

However, if the voltage of main batteries 358 is not greater 950 than the predetermined threshold value, then power manager 342 generates 952 a powerfail interrupt. In the preferred embodiment, the powerfail interrupt may be disabled in rare cases in which a sequence of CPU 344 instructions must never be interrupted by a power failure. Any disabling of the powerfail interrupt, however, is restricted to a very short period of time. Next, CPU 344 receives the generated powerfail interrupt and responsively performs 954 a powerfail powerdown sequence to protect the image data currently within camera 110. The powerfail powerdown sequence is further discussed below in conjunction with FIG. 10.

The camera 110 user may then replace 655 the main batteries 358 and activate the camera 110 power on/off switch. CPU 344 then performs 956 a powerup sequence to bring camera 110 back to normal operating mode while also preserving any existing image data. FLIH 412 then increments 958 powerfail counter 347 to indicate the occurrence of a power failure in main batteries 358. Alternately, powerfail counter 347 may be a hardware register which is incremented in power manager 342.

The first level interrupt handler 412 then notifies 960 any registered interrupt service routines 414 about the power failure restart so that the interrupt service routines 414 are aware that their corresponding hardware components have been reset by the power failure and the subsequent camera 110 powerup. The power failure notification allows the registered interrupt service routines 414 to run depending upon their relative task priority. Typically, this notification is accomplished through the use of a signal or semaphore which wakes up the interrupt service routine.

In alternate embodiments, the interrupt service routines may operate in cooperation with various other system routines. These cooperating routines thus may form various hierarchical networks which operate in synchronous or asynchronous modes. For example, a particular interrupt service routine may function in response to a device driver. The device driver, in turn, may function in response to an application program. In such cases, the interrupt service routines typically propagate their received power failure notification to any related routines in the network which require notification of the power failure restart. Finally, the FIG. 9 process then returns to step 946 and CPU 344 runs control application 400 to operate camera 110 in normal operation mode, as discussed above.

Figure 10:
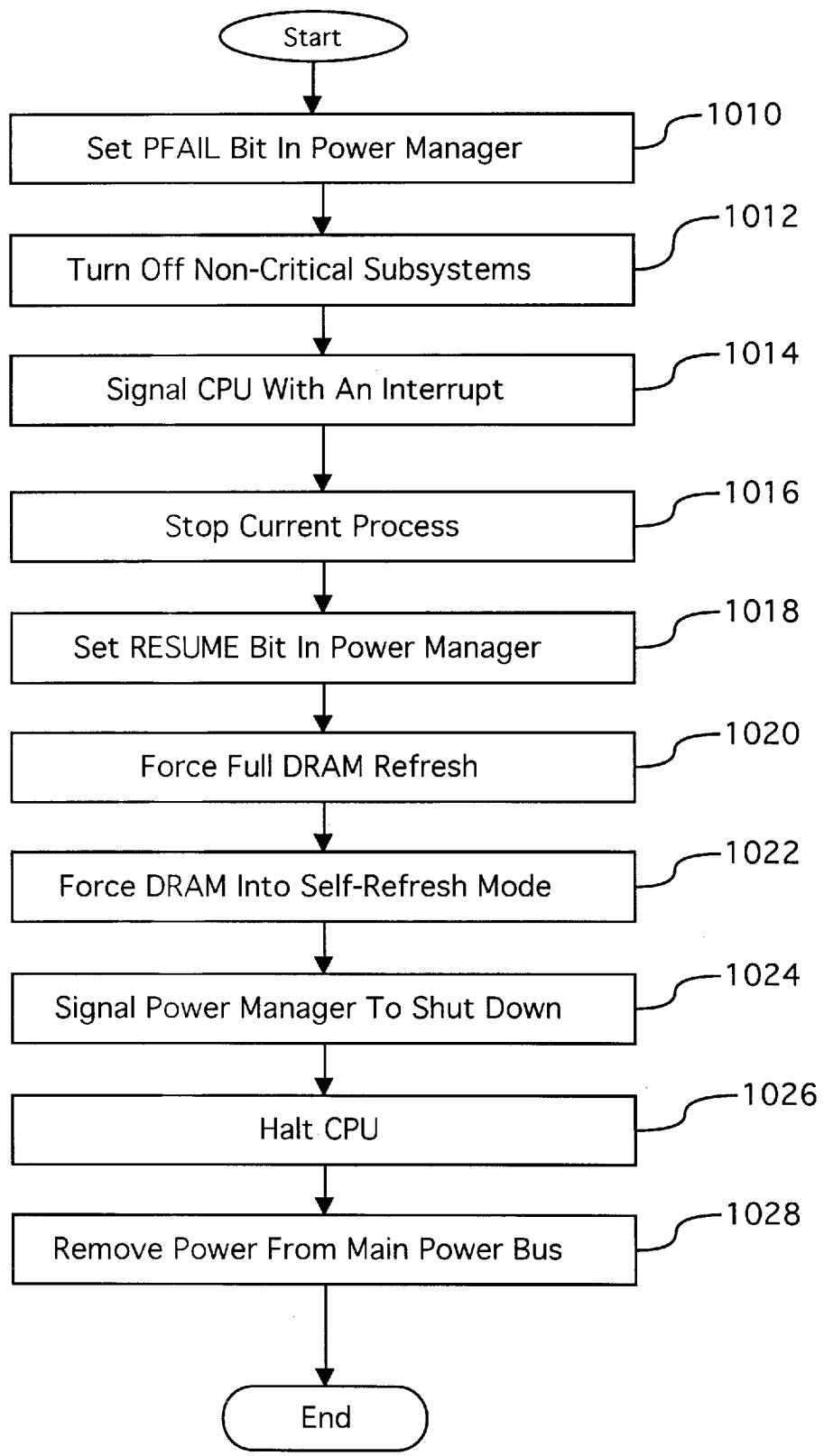
FIG. 10 is a flowchart of preferred method steps for performing a powerfail powerdown sequence according to the present invention.

Referring now to FIG. 10, a flowchart of preferred method steps for performing a powerfail powerdown sequence according to the present invention is shown. Initially, power manager 342 sets 1010 a PFAIL bit which records the occurrence of a power failure so that computer 118 software routines may subsequently access this information when needed. Next, power manager 342 turns off 1012 all non-critical subsystems. Power manager 342 then signals 1014 CPU 344 with an interrupt and CPU 344 responsively stops 1016 the current process.

Next, CPU 344 sets 1018 the RESUME bit in power manager 342 to indicate that CPU 344 should not be reset in a subsequent powerup of camera 110. CPU 344 then forces 1020 a full refresh of DRAM 346 and then forces 1022 DRAM 346 into a self-refresh mode. Next, CPU 344 signals 1024 power manager 342 to shut down and then CPU 344 halts 1026 operation. After halting, CPU 344 still receives operating power from backup batteries 360 and is essentially stopped "in place." In this static mode, system, bus 116 is in a tri-state condition and the CPU 344 clock is stopped. All CPU 344 states, however, are still intact (for example, the registers, program counter, cache and stack are preserved intact) and image data in DRAM 346 is also preserved intact. Next, power manager 342 removes 1028 operating power from main power bus 362. The FIG. 10 powerfail powerdown sequence is then complete.

Figure 11:
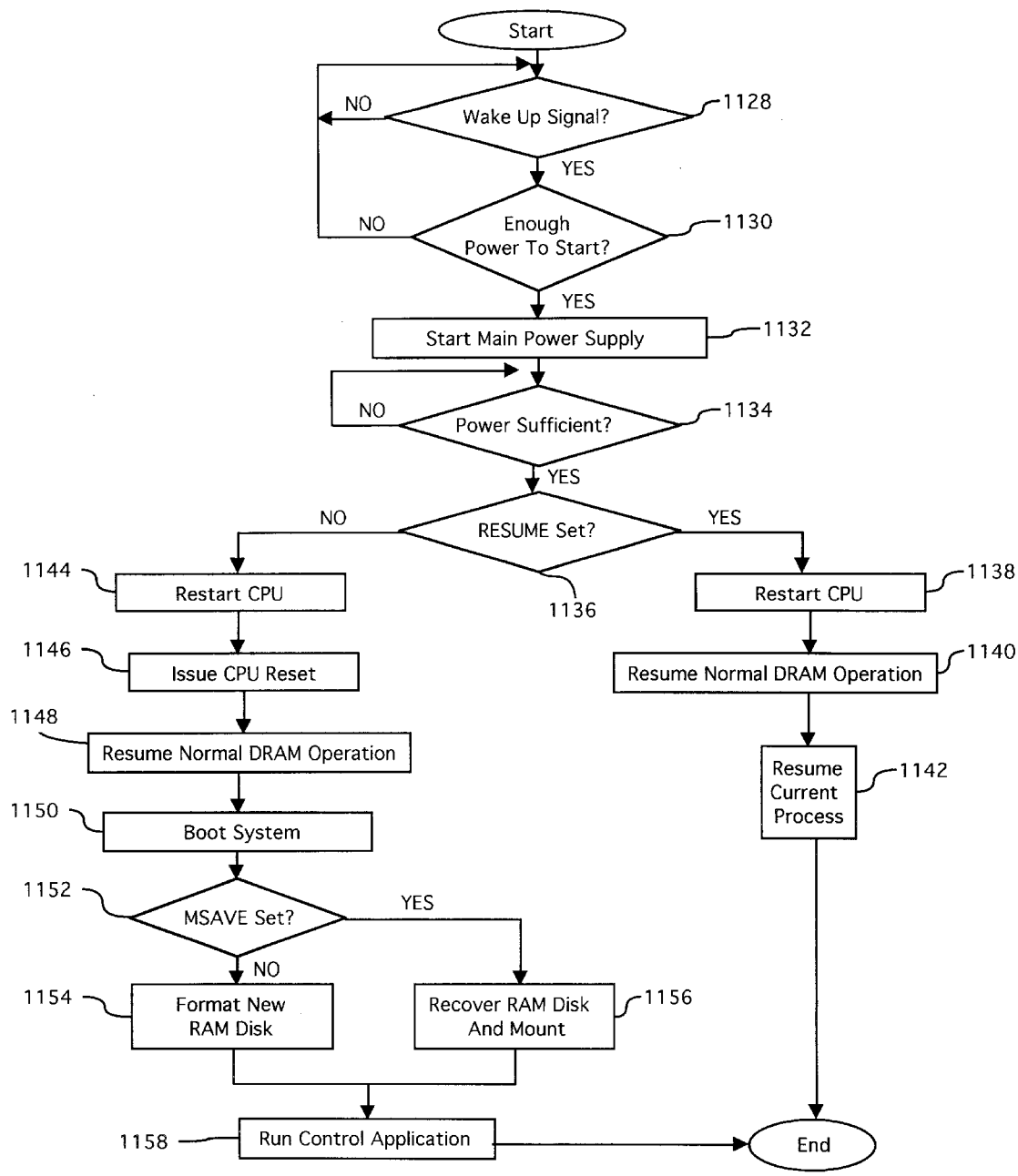
FIG. 11 is a flowchart of preferred method steps for performing a powerup sequence according to the present invention.

Referring now to FIG. 11, a flowchart of preferred method steps for performing a powerup sequence according to the present invention is shown. Initially, CPU 344 waits 1128 for a "wake up" signal which is typically generated in response to the activation of a camera 110 power on-off switch. After the "wake up" signal is generated, power manager 342 determines 1130 whether power supply 356 is generating enough operating power to start camera 110. If sufficient operating power is present, power manager 342 starts 1132 power supply 356 in normal mode with the main batteries 358 providing operating power to power supply 356 which then responsively provides the operating power to main power bus 362 and also to secondary power bus 364. Next, power manager 342 determines 1134 whether the generated operating power is maintaining a sufficient voltage level.

If operating power is sufficient in camera 110, power manager 342 then determines 1136 whether a RESUME bit has been set. In the preferred embodiment, CPU 344 sets the RESUME bit in response to a power failure in order to indicate that CPU 344 should not be reset in a subsequent powerup of camera 110. If the RESUME bit has been set, power manager 342 restarts 838 the CPU 344. The CPU 344 then resumes 1140 normal operation of DRAM 346 and also resumes 1142 the camera 110 process which was interrupted by the intervening power failure.

If the RESUME bit has not been set, then power manager 342 restarts 1144 the CPU 344 and issues 1146 a CPU 344 reset. CPU 344 then resumes 1148 normal operation of DRAM 346 and boots 1150 the computer 110 system using the system configuration 408 routine. Next, CPU 344 determines 1152 whether a MSAVE bit has been set in power manager 342. In the preferred embodiment, CPU 344 sets the MSAVE bit to specify that RAM disk 532 contains image data that should be saved upon restart of computer 118. If the MSAVE bit has not been set, computer 118 formats 1154 a new RAM disk 532. CPU 344 then runs 1158 control application 400 for normal operation of camera 110. In step 1152, if the MSAVE bit has been set, then CPU 344 recovers and mounts 1156 RAM disk 532. CPU 344 then runs 1158 control application 400 for normal operation of camera 110. The powerup process of FIG. 11 then ends.

The invention has been explained above with reference to a preferred embodiment. Other embodiments will be apparent to those skilled in the art in light of this disclosure. For example, power manager 342 may contain various registers 646 other than those discussed above in the preferred embodiment. Therefore, these and other variations upon the preferred embodiment are intended to be covered by the present invention, which is limited only by the appended claims.

What is claimed is:

1. A system for managing power conditions in a digital camera device, comprising:
    a processor coupled to said digital camera device for controlling said digital camera device; and
    a power manager coupled to said processor, said power manager including registers for containing status information, interrupt information, and control information;
    said power manager providing said status information, said interrupt information, and said control information to said processor for controlling said digital camera device.

2. The system of claim 1 wherein said conditions include a low power level condition to which said processor responsively performs a powerdown sequence and a powerup sequence to protect data including captured image data in said digital camera device.

3. The system of claim 1 wherein said power manager uses a sensor device to obtain said power state information from a power source coupled to said digital camera device.

4. The system of claim 1 wherein said power manager further comprises a control register for storing said control information, an interrupt register for storing said interrupt information, and a condition register for storing said status information.

5. The system of claim 1 wherein said control information indicates the contents of memory devices coupled to said digital camera device.

6. The system of claim 5 wherein said control information includes a RESUME bit and a MSAVE bit which said power manager uses to indicate shutdown states for said digital camera device.

7. The system of claim 1 wherein said power manager further comprises a state machine, a LCD generator and a bus interface.

8. The system of claim 1 wherein said processor generates selected interrupts to control said digital camera device in response to said interrupt information from said power manager.

9. A method for managing power conditions in a digital camera device, comprising the steps of:
    controlling said digital camera device with a processor coupled to said digital camera device;
    storing status information, interrupt information, and control information in a power manager coupled to said processor; and
    providing said status information, said interrupt information, and said control information to said processor for controlling said digital camera device.

10. The method of claim 9 wherein said conditions include a low power level condition to which said processor responsively performs a powerdown sequence and a powerup sequence to protect data including captured image data in said digital camera device.

11. The method of claim 9 wherein said power manager uses a sensor device to obtain said power state information from a power source coupled to said digital camera device.

12. The method of claim 9 wherein said power manager further comprises a control register for storing said control information, an interrupt register for storing said interrupt information, and a condition register for storing said status information.

13. The method of claim 9 wherein said control information indicates the contents of memory devices coupled to said digital camera device.

14. The method of claim 13 wherein said control information includes a RESUME bit and a MSAVE bit which said power manager uses to indicate shutdown states for said digital camera device.

15. The method of claim 9 wherein said power manager further comprises a state machine, a LCD generator and a bus interface.

16. The method of claim 9 wherein said processor generates selected interrupts to control said digital camera device in response to said interrupt information from said power manager.

17. A computer-readable medium comprising program instructions for managing power conditions in a digital camera device by performing the steps of:
    controlling said digital camera device with a processor coupled to said digital camera device;
    storing status information, interrupt information, and control information in a power manager coupled to said processor; and providing said status information, said interrupt information, and said control information to said processor for controlling said digital camera device.

18. A system for managing power conditions in a digital camera device, comprising:

means for controlling said digital camera device with a processor coupled to said digital camera device;

means for storing status information, interrupt information, and control information in a power manager coupled to said processor; and means for providing said status information, said interrupt information, and said control information to said processor for controlling said digital camera device.

* * * * *